US010422446B2

(12) United States Patent
Joshi et al.

(10) Patent No.: US 10,422,446 B2
(45) Date of Patent: Sep. 24, 2019

(54) HANGER FOR MOUNTING MULTIPLE CABLES

(71) Applicant: CommScope Technologies LLC, Hickory, NC (US)

(72) Inventors: Aviral Joshi, Chicago, IL (US); Ronald A. Vaccaro, Taylorsville, NC (US); Taig S. Rajpal, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/842,108

(22) Filed: Dec. 14, 2017

(65) Prior Publication Data
US 2018/0172183 A1    Jun. 21, 2018

Related U.S. Application Data

(60) Provisional application No. 62/438,480, filed on Dec. 23, 2016, provisional application No. 62/437,195, filed on Dec. 21, 2016.

(51) Int. Cl.
*F16L 3/22* (2006.01)
*H02G 1/00* (2006.01)
(Continued)

(52) U.S. Cl.
CPC ............. *F16L 3/221* (2013.01); *F16L 3/08* (2013.01); *H02G 1/00* (2013.01); *H02G 3/263* (2013.01); *H02G 3/32* (2013.01)

(58) Field of Classification Search
CPC ..... F16L 3/08; F16L 3/22; F16L 3/133; F16L 3/24; F16L 3/237; F16L 3/233;
(Continued)

(56) References Cited

U.S. PATENT DOCUMENTS 1,376,284 A    4/1921   Kohn
1,452,497 A    4/1923   Fischer
(Continued)

FOREIGN PATENT DOCUMENTS

FR          2145985 A6 *  2/1973  ............. F16L 3/223
JP       2012002323 A      1/2012
(Continued)

OTHER PUBLICATIONS

U.S. Appl. No. 15/081,177, filed Mar. 25, 2016, Vaccaro et al.
(Continued)

*Primary Examiner* — Kimberly T Wood
(74) *Attorney, Agent, or Firm* — Myers Bigel, P.A.

(57) ABSTRACT

A cable hanger for mounting cables to a mounting structure includes: a base panel; a pair of arms attached to opposite ends of the base panel; and a pair of locking projections, each locking projection being attached adjacent a free end of a respective arm. Each arm is configured to define a respective internal cavity configured to grasp cable. The arms and the base panel combine to define an external cavity for grasping cable. The cable hanger can be deflected from a relaxed state to a deflected state by forcing the locking projections toward each other. In the deflected state the cable hanger may be mounted to a mounting structure, with the arms inserted through a hole in the mounting structure and exerting outward pressure on edges of the hole, and the locking projections maintaining the cable hanger in a mounted position on the mounting structure.

8 Claims, 7 Drawing Sheets

(51) Int. Cl.
*F16L 3/08* (2006.01)
*H02G 3/00* (2006.01)
*H02G 3/32* (2006.01)

(58) Field of Classification Search
CPC ... F16L 3/223; F16L 3/13; F16L 3/222; F16L 3/221; H02G 1/00
USPC ........... 248/62, 67.7, 68.1, 69.1, 65, 49, 66; 174/72 A, 71 R, 40 R, 40 CC, 164, 158 R, 174/147, 138 G
See application file for complete search history.

(56) References Cited

U.S. PATENT DOCUMENTS

| | | | | |
|---|---|---|---|---|
| 2,032,413 | A * | 3/1936 | Hall | F22G 7/065 248/49 |
| 2,179,406 | A * | 11/1939 | Fitzpatrick | F16L 3/221 174/146 |
| 2,375,513 | A | 8/1945 | Bach | |
| 2,453,980 | A * | 11/1948 | Hartman | F16L 3/13 248/68.1 |
| 2,470,814 | A * | 5/1949 | Hain | F16L 3/221 248/68.1 |
| 2,495,848 | A * | 1/1950 | Kiesel | F16B 5/0685 211/89.01 |
| 2,560,845 | A | 7/1951 | Carpenter et al. | |
| 2,606,865 | A | 8/1952 | Liptay | |
| 2,723,431 | A | 11/1955 | Di Renzo | |
| 2,746,110 | A * | 5/1956 | Bedford, Jr. | F16B 2/241 211/26.2 |
| 2,990,150 | A * | 6/1961 | Weigel | F16L 3/223 248/300 |
| 3,042,352 | A | 7/1962 | Stamper | |
| 3,050,578 | A | 8/1962 | Huebner | |
| 3,163,712 | A | 12/1964 | Cochran | |
| 3,404,858 | A | 10/1968 | Erwin | |
| 3,430,904 | A * | 3/1969 | Soltysik | F16L 3/13 248/73 |
| 3,485,467 | A * | 12/1969 | Fuchs | F16L 3/237 174/97 |
| 3,501,117 | A * | 3/1970 | Soltysik | F16L 3/13 24/339 |
| 3,536,281 | A | 10/1970 | Meehan et al. | |
| 3,599,915 | A * | 8/1971 | Soltysik | F16B 2/065 248/68.1 |
| 3,916,089 | A * | 10/1975 | Sloan | B60M 1/34 174/164 |
| 3,981,048 | A | 9/1976 | Moody et al. | |
| 4,244,542 | A * | 1/1981 | Mathews | F16L 3/222 138/112 |
| 4,295,618 | A * | 10/1981 | Morota | F16L 3/237 248/73 |
| 4,306,697 | A * | 12/1981 | Mathews | F16L 3/222 248/68.1 |
| 4,344,480 | A * | 8/1982 | Boyer | F28F 9/0135 165/162 |
| 4,669,156 | A * | 6/1987 | Guido | F16L 3/2235 24/336 |
| 4,795,856 | A * | 1/1989 | Farmer | F16L 3/223 174/40 R |
| 4,813,639 | A | 3/1989 | Midkiff et al. | |
| 5,035,383 | A * | 7/1991 | Rainville | H02G 3/26 248/68.1 |
| 5,085,384 | A | 2/1992 | Kasubke | |
| 5,320,312 | A * | 6/1994 | Hoenninger | F16L 3/227 211/107 |
| 5,393,021 | A | 2/1995 | Nelson | |
| 5,587,555 | A | 12/1996 | Rinderer | |
| 5,833,188 | A | 11/1998 | Studdiford et al. | |
| 5,876,000 | A | 3/1999 | Ismert | |
| 5,921,520 | A | 7/1999 | Wisniewski | |
| 5,971,329 | A | 10/1999 | Hickey | |
| 6,317,933 | B1 | 11/2001 | Suenaga | |
| 6,323,430 | B1 | 11/2001 | Finona | |
| 6,354,543 | B1 | 3/2002 | Paske | |
| 6,899,305 | B2 | 5/2005 | Korczak et al. | |
| 7,131,792 | B2 | 11/2006 | Doverspike | |
| 1,354,518 | A1 | 6/2008 | Moretto | |
| 7,500,644 | B2 * | 3/2009 | Naudet | F02C 7/222 174/146 |
| 7,651,056 | B2 | 1/2010 | Tjerrild | |
| 7,997,546 | B1 | 8/2011 | Andersen et al. | |
| 8,020,811 | B2 | 9/2011 | Nelson | |
| 8,191,836 | B2 | 6/2012 | Korczak | |
| 8,439,316 | B2 | 5/2013 | Feige | |
| 9,127,789 | B2 | 9/2015 | Caspari et al. | |
| 9,206,927 | B2 | 12/2015 | Carter et al. | |
| 9,841,123 | B1 | 12/2017 | White | |
| 9,853,434 | B2 | 12/2017 | Vaccaro | |
| 9,866,004 | B2 | 1/2018 | Vaccaro et al. | |
| 9,879,803 | B2 | 1/2018 | Leng | |
| 9,903,510 | B2 | 2/2018 | Joshi et al. | |
| 9,995,414 | B2 | 6/2018 | Joshi et al. | |
| 10,215,308 | B2 | 2/2019 | Bartos | |
| 2002/0005463 | A1 | 1/2002 | Korczak et al. | |
| 2003/0173470 | A1 * | 9/2003 | Geiger | F16L 3/223 248/55 |
| 2004/0113027 | A1 * | 6/2004 | Nakanishi | F16L 3/223 248/68.1 |
| 2004/0251386 | A1 * | 12/2004 | Mizukoshi | F16L 3/223 248/68.1 |
| 2005/0109887 | A1 | 5/2005 | Catapano | |
| 2005/0109890 | A1 | 5/2005 | Korczak et al. | |
| 2005/0253025 | A1 * | 11/2005 | Benoit | F16L 3/13 248/74.1 |
| 2006/0237217 | A1 | 10/2006 | Glew | |
| 2006/0249633 | A1 | 11/2006 | Korczak et al. | |
| 2007/0120023 | A1 * | 5/2007 | Martinez | E02F 9/2275 248/75 |
| 2007/0246616 | A1 | 10/2007 | Budagher | |
| 2008/0093510 | A1 | 4/2008 | Oh et al. | |
| 2009/0230256 | A1 | 9/2009 | Widlacki et al. | |
| 2009/0242715 | A1 | 10/2009 | Kosidlo et al. | |
| 2009/0294602 | A1 | 12/2009 | Korczak | |
| 2010/0084520 | A1 | 4/2010 | Ohno | |
| 2011/0107719 | A1 | 5/2011 | Kodi | |
| 2011/0226913 | A1 | 9/2011 | Feige | |
| 2011/0260025 | A1 | 10/2011 | Aoshima et al. | |
| 2011/0283515 | A1 | 11/2011 | Korczak | |
| 2012/0045608 | A1 | 2/2012 | Huchet et al. | |
| 2012/0085577 | A1 * | 4/2012 | Eshima | B60R 16/0215 174/70 R |
| 2012/0305724 | A1 | 12/2012 | Diez Herrera et al. | |
| 2013/0104494 | A1 | 5/2013 | Evangelista et al. | |
| 2013/0146720 | A1 * | 6/2013 | Meyers | F16L 3/223 248/68.1 |
| 2013/0146721 | A1 | 6/2013 | White | |
| 2013/0175407 | A1 | 7/2013 | Williams et al. | |
| 2013/0320182 | A1 * | 12/2013 | Kataoka | F16L 3/12 248/562 |
| 2014/0054425 | A1 | 2/2014 | Jang | |
| 2014/0260083 | A1 | 9/2014 | Zhang et al. | |
| 2015/0136473 | A1 | 5/2015 | Jafari et al. | |
| 2015/0169781 | A1 | 6/2015 | Wilson et al. | |
| 2016/0281881 | A1 | 9/2016 | Vaccaro et al. | |
| 2016/0281883 | A1 | 9/2016 | Vaccaro et al. | |
| 2016/0327187 | A1 | 11/2016 | Brown | |
| 2016/0341340 | A1 | 11/2016 | Gomes Fernandes | |
| 2018/0172183 | A1 | 6/2018 | Joshi et al. | |

FOREIGN PATENT DOCUMENTS

| | | | |
|---|---|---|---|
| JP | 2012-222986 A | | 11/2012 |
| WO | WO 02/095956 A2 | | 11/2002 |
| WO | WO 2008/082595 A1 | | 7/2008 |

OTHER PUBLICATIONS

U.S. Appl. No. 15/081,240, filed Mar. 25, 2016, Vaccaro.
U.S. Appl. No. 15/335,614, filed Oct. 27, 2016, Joshi et al.

(56) References Cited

OTHER PUBLICATIONS

Notification of Transmittal of the International Search Report and the Written Opinion of the International Searching Authority, or the Declaration corresponding to International Application No. PCT/US2017/056109 dated Jan. 24, 2018.
Notification of Transmittal of the International Search Report and the Written Opinion of the International Searching Authority, or the Declaration corresponding to International Application No. PCT/US2017/060115 dated Feb. 14, 2018.
Notification of Transmittal of the International Search Report and the Written Opinion of the International Searching Authority, or the Declaration corresponding to International Application No. PCT/US2017/062730 dated Mar. 13, 2018.
Notification of Transmittal of the International Search Report and the Written Opinion of the International Searching Authority, or the Declaration corresponding to International Application No. PCT/US2017/062743 dated Mar. 12, 2018.
Notification of Transmittal of the International Search Report and the Written Opinion of the International Searching Authority, or the Declaration corresponding to International Application No. PCT/US2017/065801 dated Apr. 13, 2018.
Notification of Transmittal of the International Search Report and the Written Opinion of the International Searching Authority, or the Declaration corresponding to International Application No. PCT/US2017/068510 dated Apr. 17, 2018.

\* cited by examiner

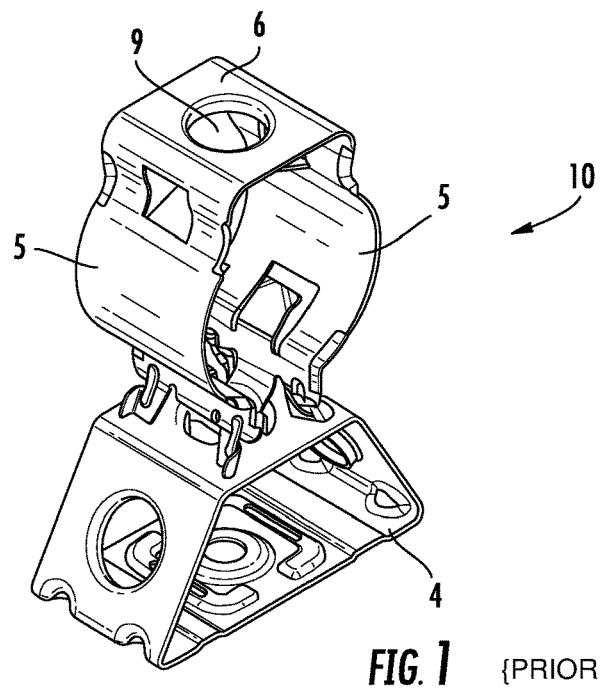
FIG. 1 {PRIOR ART}
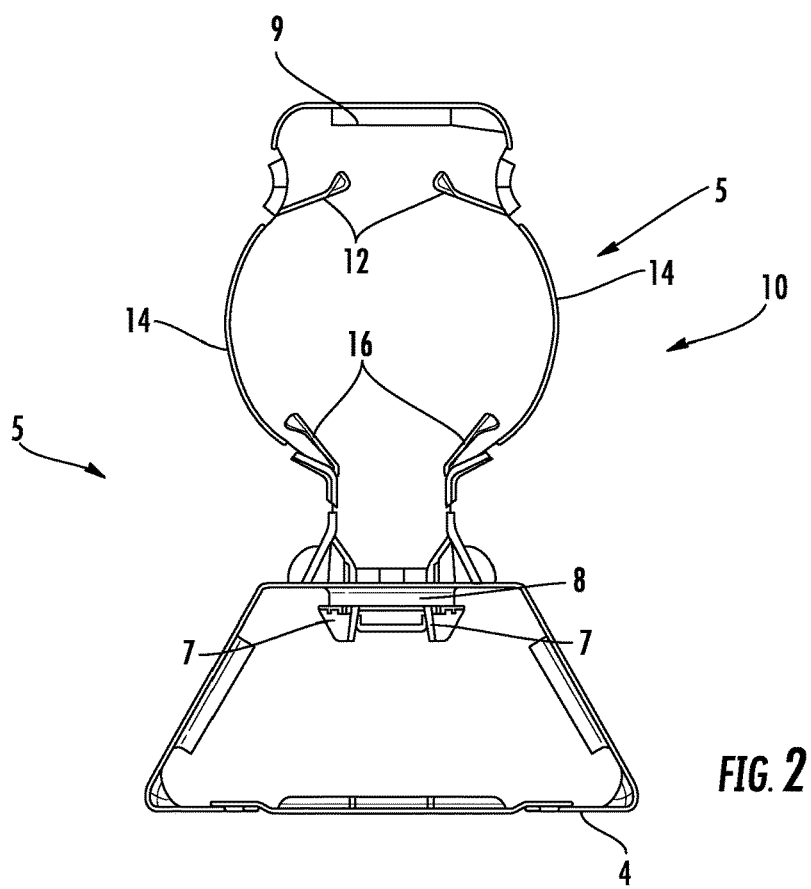
FIG. 2 {PRIOR ART}

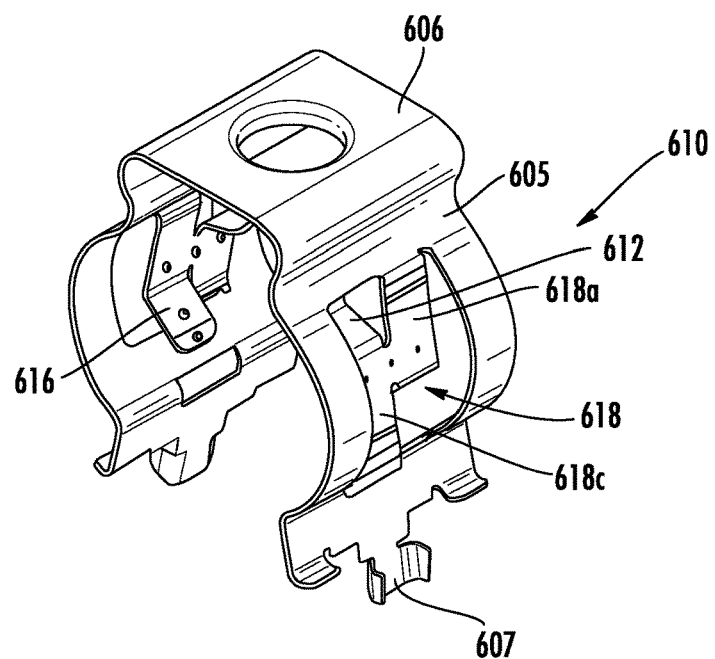
FIG. 3 {PRIOR ART}
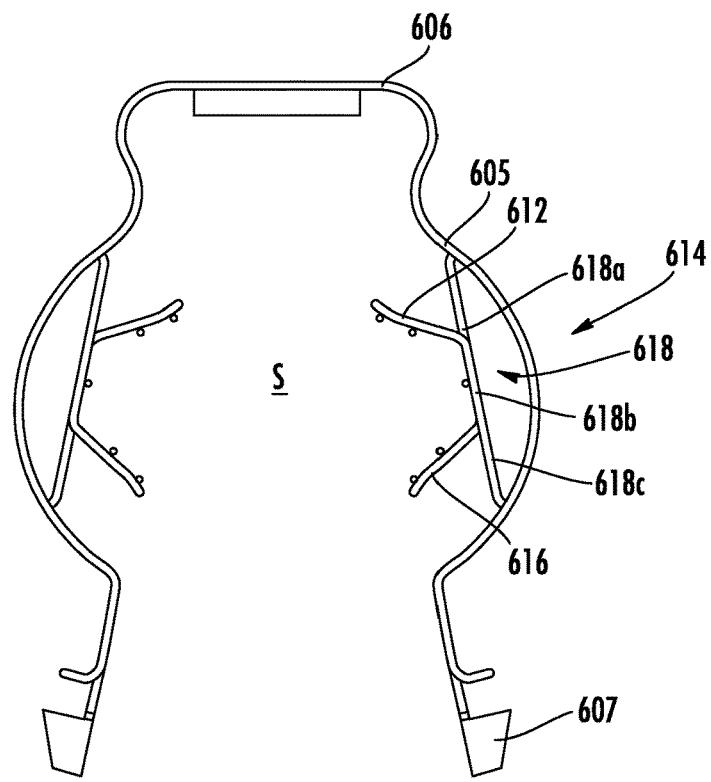
FIG. 4 {PRIOR ART}

HANGER FOR MOUNTING MULTIPLE CABLES

RELATED APPLICATION

The present application claims priority from and the benefit of U.S. Provisional Patent Application Nos. 62/438,480, filed Dec. 23, 2016, and 62/437,195, filed Dec. 21, 2016, the disclosures of which are hereby incorporated herein in their entireties.

FIELD OF THE INVENTION

The present invention relates generally to devices for supporting cables and, in particular, to hangers for securing cables to support structures.

BACKGROUND OF THE INVENTION

Cable hangers are commonly used to secure cables to structural members of antenna towers and or along tunnel walls. Generally, each cable is attached to a structural member by cable hangers mounted at periodically-spaced attachment points.

Antenna towers and or tunnels may be crowded due to the large numbers of cables required for signal-carrying. Over time, as systems are added, upgraded and/or expanded, installation of additional cables may be required. To conserve space, it may be desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

One popular stackable cable hanger is discussed in U.S. Pat. No. 8,191,836 to Korczak, the disclosure of which is hereby incorporated herein by reference in its entirety. One such cable hanger, designated broadly at 10, is shown in FIGS. 1 and 2. The hanger 10 includes curved arms 5 that extend from a flat base 6. Locking projections 7 extend from the free ends of the arms 5. As can be seen in FIGS. 1 and 2, the locking projections 7 are inserted into a reinforced hole 8 in a tower structure 4 to mount the hanger 10 thereon. The base 6 of the hanger 10 includes a reinforced hole 9 that can receive the projections of another hanger 10 to mount a second cable.

As can be best seen in FIG. 2, the arms 5 include arcuate sections 14 that together generally define a circle within which a cable can reside. Two cantilevered tabs 12 extend radially inwardly and toward the base 6 at one end of the arcuate sections 14, and two cantilevered tabs 16 extend radially inwardly and toward the base 6 from the opposite ends of the arcuate sections 14. The cantilevered tabs 12, 16 are deployed to deflect radially outwardly when the hanger 10 receives a cable for mounting; this deflection generates a radially inward force from each tab 12, 16 that grips the jacket of the cable.

Hangers can be "stacked" onto each other by inserting the locking projections 7 of one hanger into the large hole 9 of the next hanger. One variety of cable hanger of this type is the SNAP-STAK® hanger, available from CommScope, Inc. (Joliet, Ill.).

The SNAP-STAK® hanger is offered in multiple sizes that correspond to the outer diameters of different cables. This arrangement has been suitable for use with RF coaxial cables, which tend to be manufactured in only a few different outer diameters; however, the arrangement has been less desirable for fiber optic cables, which tend to be manufactured in a much greater variety of diameters. Moreover, fiber optic cables tend to be much heavier than coaxial cables (sometimes as much as three times heavier per unit foot), which induces greater load and stress on the hangers.

Multiple approaches to addressing this issue are offered in co-assigned and co-pending U.S. Patent Publication No. 2016/0281881 to Vaccaro, the disclosure of which is hereby incorporated herein by reference in full. One cable hanger discussed in this publication is shown in FIGS. 3 and 4 and designated broadly at 610 therein. The cable hanger 610 is somewhat similar to the cable hanger 10, inasmuch as it has a base 606, curved arms 605 and locking projections 607 that resemble those of the hanger 10 discussed above. However, the cable hanger 610 also has flex members 618 that define chords across the arcuate sections 614 of the arms 605. As can be seen in FIG. 4, cantilevered gripping members 612, 616 extend from the flex members 618 and into the cable-gripping space S within the arms 605. It can also be seen in FIG. 3 that the flex members 618 are tripartite, with two vertically offset horizontal runs 618a, 618c merging with the arcuate sections 614 of the arms 605 and a vertical run 618b extending between the horizontal runs 618a, 618c. The gripping members 612, 616 extend from opposite sides of the vertical run 618b and are vertically offset from each other.

In use, the cable hanger 610 is employed in the same manner as the cable hanger 10; a cable is inserted into the space S between the arms 605, which are then closed around the cable as the locking projections 607 are inserted into a mounting hole. The cantilevered gripping members 612, 616 can help to grip and to center the cable within the space S. The presence of the flex members 618, which are fixed end beams rather than cantilevered tabs, can provide additional gripping force beyond that of the cable hanger 10.

SUMMARY

As a first aspect, embodiments of the invention are directed to a cable hanger for mounting cables to a mounting structure. The cable hanger comprises: a base panel; a pair of arms attached to opposite ends of the base panel; and a pair of locking projections, each locking projection being attached adjacent a free end of a respective arm. Each arm is configured to define a respective internal cavity configured to grasp a first cable. The arms and the base panel combine to define an external cavity for grasping a second cable. The cable hanger can be deflected from a relaxed state to a deflected state by forcing the locking projections toward each other. In the deflected state the cable hanger may be mounted to a mounting structure, with the arms inserted through a hole in the mounting structure and exerting outward pressure on edges of the hole, and the locking projections maintaining the cable hanger in a mounted position on the mounting structure.

As a second aspect, embodiments of the invention are directed to a cable hanger for mounting cables to a mounting structure comprising: a base panel; a pair of arms attached to opposite ends of the base panel; and a pair of locking projections, each locking projection being attached adjacent a free end of a respective arm. The arms and the base panel define at least one internal cavity and at least one external cavity configured to grasp cables.

As a third aspect, embodiments of the invention are directed to a cable hanger for mounting cables to a mounting structure comprising: a head portion defining an internal head cavity for mounting a first cable; a pair of arm portions merging with the head portion, each arm portion defining an internal arm cavity for mounting a respective second cable; a pair of locking segments, each locking segment merging with a respective arm portion; and a first pair of gripping members, a first one of the gripping members extending from the head portion, and a second one of the gripping members extending from a first one of the arm portions, the gripping members defining a first external cable mounting location for mounting a third cable. The cable hanger can be deflected from a relaxed state to a deflected state by forcing the locking projections toward each other. In the deflected state the cable hanger may be mounted to a mounting structure, with the arms inserted through a hole in the mounting structure and exerting outward pressure on edges of the hole, and the locking projections maintaining the cable hanger in a mounted position on the mounting structure.

As a fourth aspect, embodiments of the invention are directed to a cable hanger for mounting cables to a mounting structure comprising: a formed strip, the strip having a periphery, the strip defining a plurality of internal cavities defined by walls configured to receive and grasp first cables, the strip including a pair of locking projections configured to be deflected into a deflected state by forcing the locking projections toward each other, wherein in the deflected state the cable hanger may be mounted to a mounting structure; and at least one pair of gripping members extending from the walls of the strip, the gripping members defining an external cable mounting location configured to receive and grasp a second cable.

BRIEF DESCRIPTION OF THE FIGURES

FIG. 1 is a perspective view of a prior art cable hanger.

FIG. 2 is a top view of the prior art cable hanger of FIG. 1.

FIG. 3 is a perspective view of another prior art cable hanger.

FIG. 4 is a top view of the cable hanger of FIG. 3.

DETAILED DESCRIPTION

The present invention is described with reference to the accompanying drawings, in which certain embodiments of the invention are shown. This invention may, however, be embodied in many different forms and should not be construed as limited to the embodiments that are pictured and described herein; rather, these embodiments are provided so that this disclosure will be thorough and complete, and will fully convey the scope of the invention to those skilled in the art. It will also be appreciated that the embodiments disclosed herein can be combined in any way and/or combination to provide many additional embodiments.

Unless otherwise defined, all technical and scientific terms that are used in this disclosure have the same meaning as commonly understood by one of ordinary skill in the art to which this invention belongs. The terminology used in the below description is for the purpose of describing particular embodiments only and is not intended to be limiting of the invention. As used in this disclosure, the singular forms "a", "an" and "the" are intended to include the plural forms as well, unless the context clearly indicates otherwise. It will also be understood that when an element (e.g., a device, circuit, etc.) is referred to as being "attached", "connected" or "coupled" to another element, it can be directly connected or coupled to the other element or intervening elements may be present. In contrast, when an element is referred to as being "directly attached", "directly connected" or "directly coupled" to another element, there are no intervening elements present.

Figure 5:
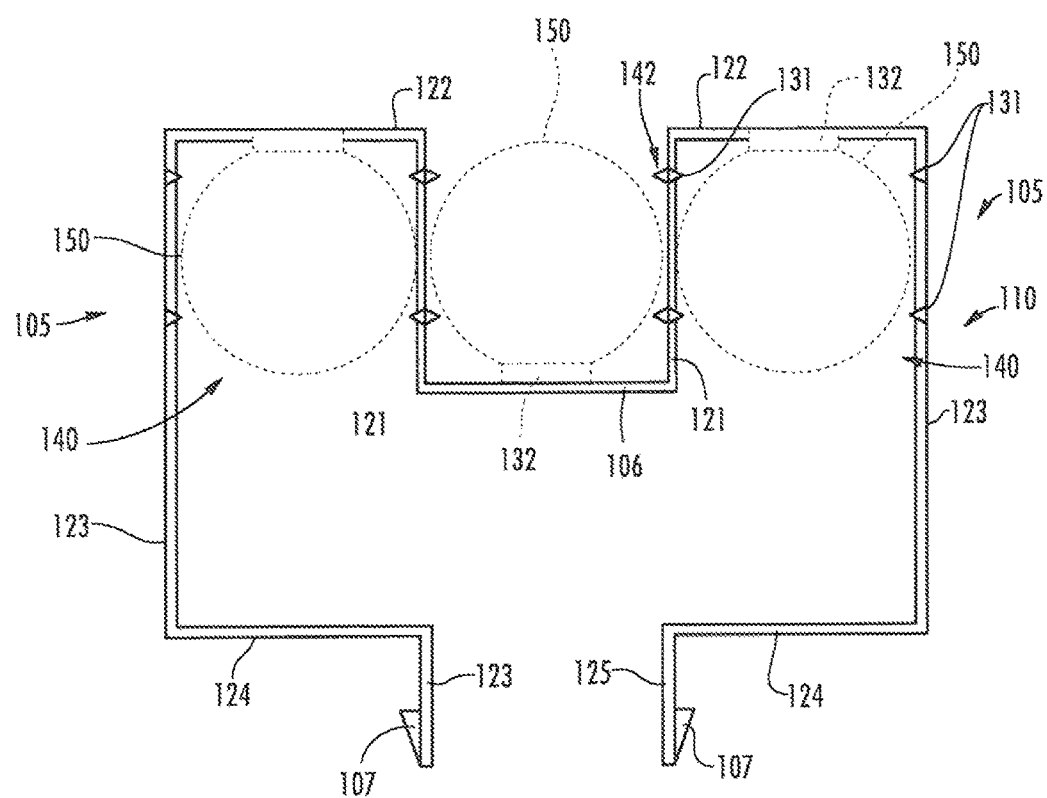
FIG. 5 is a top view of a cable hanger capable of mounting multiple cables according to embodiments of the invention.

Referring now to the drawings, a cable hanger 110 according to embodiments of the invention is shown in FIG. 5. The cable hanger 110 has a base panel 106 with two arms 105 extending from opposite ends thereof. Each of the arms 105 is a mirror image of the other arm 105 and includes a plurality of segments. An inboard segment 121 extends rearwardly and generally perpendicularly from the edge of the base panel 106. A rear segment 122 extends laterally and generally perpendicularly from the rear end of each inboard segment 121. An outboard segment 123 extends forwardly and generally perpendicularly from the outer end of each rear segment 122. A forward segment 124 extends inwardly and generally perpendicularly from the forward end of each outboard segment 123. Finally, a lock segment 125 extends generally perpendicularly and forwardly from the inner end of each forward segment 124. Locking projections 107 are located on the lock segments 125. (As used herein, the "forward" or "front" direction is the direction extending from the base panel 106 toward the locking segments 125. The "rear" direction is the opposite of the front direction. "Lateral" and "outboard" refer to the direction normal to the front and rear directions that extends away from the center of the cable hanger 110 toward the outboard segments 123, and "inboard" refers to the opposite of the outboard direction).

This configuration creates cavities in which cables can be mounted. More specifically, the inboard, rear and outboard segments 121, 122, 123 create internal lateral cavities 140, and the base panel 106 and the inboard segments 121 create an external central cavity 142 (as used herein, a cavity is "internal" when it is located within the periphery of the cable hanger 110, and is "external" when it is located outside the periphery of the cable hanger 110).

The cable hanger 110 may include a number of cable gripping features, such as barbs, lances, nubs, teeth, and the like. The cable hanger 110 shown in FIG. 5 includes barbs 131 that extend from the inboard segments 121 into both the lateral and central cavities 140, 142. Also, lances 132 extend from the base panel 106 into the central cavity 142 and from the rear segments 122 into the lateral cavities 140.

As is also shown in FIG. 5, cables 150 can be mounted within the lateral and central cavities 140, 142. It can be seen that a single cable hanger 110 can hold up to three cables 150 at once, which can reduce the number of cable hangers 110 required to mount multiple cables. The barbs 131 and the lances 132 can assist in grasping cables 150 mounted in the cavities 140, 142. As with the cable hangers 10, 610 discussed above, the cable hanger 110 can be mounted to a mounting structure via the locking projections 107 being deflected toward each other from a relaxed state and being inserted into a hole (typically ¾ inch) in a mounting structure in the deflected condition. The arms 105 exert outward pressure on edges of the hole, and the locking projections 107 maintain the cable hanger 110 in a mounted position on the mounting structure.

Those skilled in this art will appreciate that, although the cavities 140, 142 are shown as being similar, if not identical, in size, in other embodiments the cable hanger 110 may be configured such that the lateral and central cavities 140, 142 are of different sizes, or even such that each of the lateral cavities 140 is of a different size. In addition, in some embodiments additional segments may be included in the arms 105 in a "square wave" pattern so that more cables (e.g., five or seven) may be mounted in a single cable hanger.

Further, the segments may be oriented somewhat different relative to each other. For example, the inboard segments 121 may be disposed at an oblique angle relative to the base panel 106 and the rearward segments 122. If the inboard segments 121 were angled such that their rearward ends (where they merge with the rear segments 122) were closer together than their forward ends (where they merge with the base panel 106), the cavities 140, 142 created thereby would be trapezoidal in shape, with the open end of the trapezoid being relatively narrow, and thereby would be likely to capture cables more securely. If on the other hand, the inboard segments 121 were angled so that their rearward ends were farther apart than their forward ends, the resulting trapezoidal cavities would have their wider ends open, which may facilitate the entry of cables in the cavities. Other configurations are also possible, including those in which some or all of the segments of the arms 105 are arcuate or curvilinear rather than straight.

Figure 6:
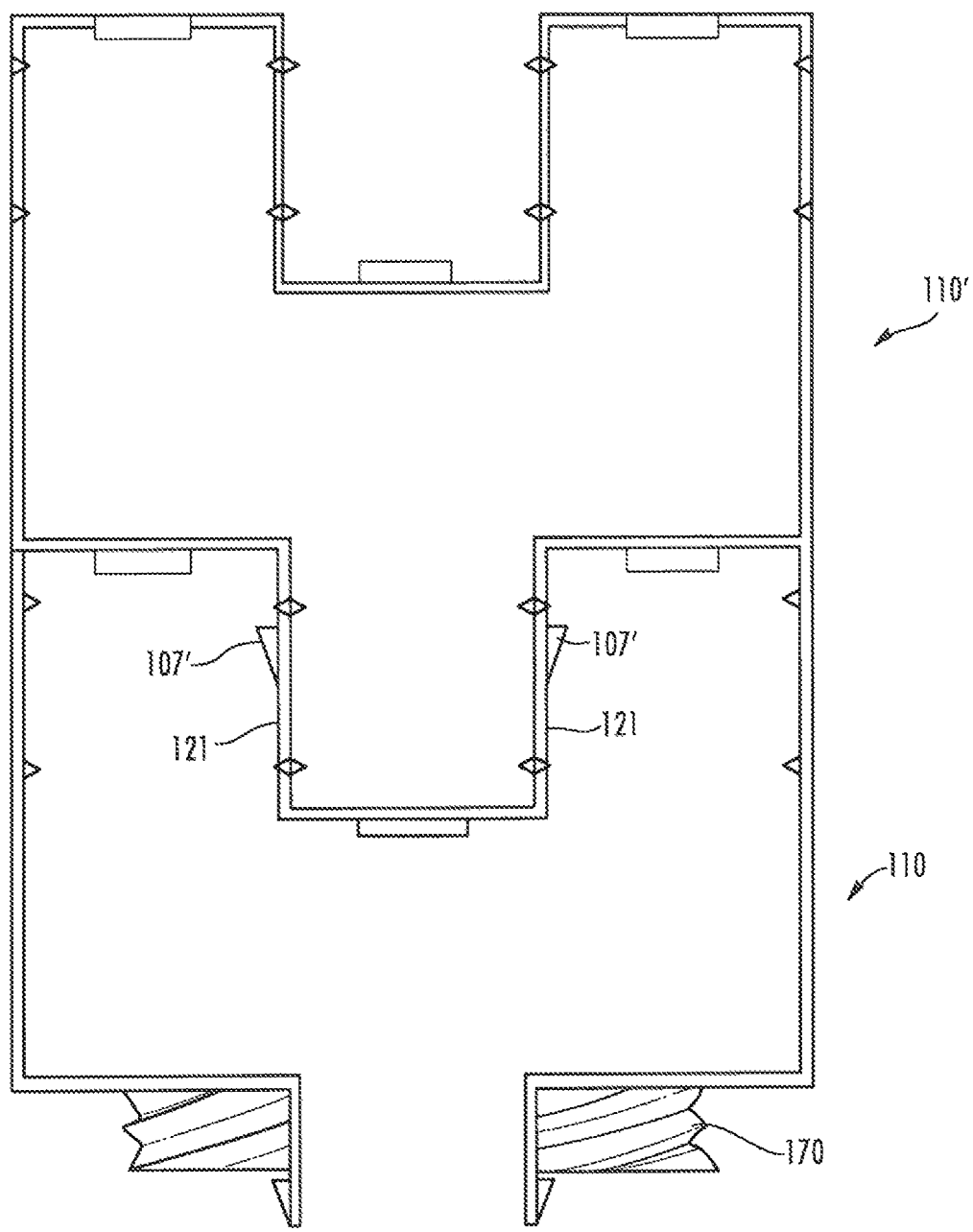
FIG. 6 is a top view of two cable hangers of FIG. 5 deployed in a stacked configuration.

Referring now to FIG. 6, two cable hangers 110, 110' are shown mounted in a stacked relationship. As can be seen from FIG. 6, the locking projections 107' of the cable hanger 110' are inserted into holes (not shown) in the inboard segments 121 of the cable hanger 110. The cable hanger 110 is mounted in a mounting structure 170. In this manner, additional cables (three additional cables in this instance) can be mounted to the same mounting location on the mounting structure 170 with only a single additional cable hanger.

Figure 7:
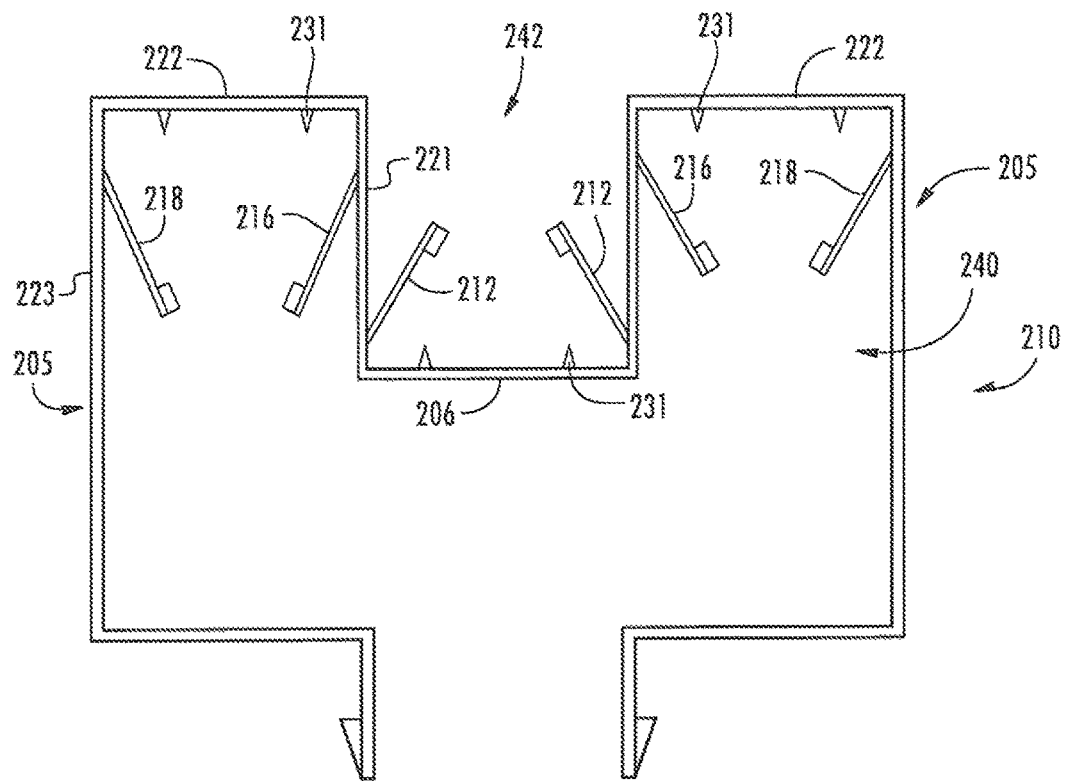
FIG. 7 is a top view of a cable hanger capable of mounting multiple cables according to alternative embodiments of the invention.

Referring now to FIG. 7, another embodiment of a cable hanger, designated broadly at 210, is shown therein. The cable hanger 210 is similar to the cable hanger 110 in general configuration, with a base panel 206, arms 205 having the same five segments as discussed above, and locking projections 207. However, the cable hanger 210 also includes two cantilevered gripping tabs 212 that extend from the base panel 206 into the central cavity 242, and further includes two cantilevered gripping tabs 216, 218 that extend from, respectively, the inboard segment 221 and the outboard segment 223 of each lateral cavity 240. Barbs 231 also extend into the cavities 240, 242 from the base panel 206 and the rear segments 222. Thus, cables (not shown in FIG. 7) can be mounted within each cavity 240, 242 and held in place by the gripping tabs 212, 216, 218.

The gripping tabs 212, 216, 218 may take a variety of configurations. Some potential configurations are shown in U.S. Patent Publication No. 2016/0281881 to Vaccaro and U.S. Pat. No. 8,191,836 to Korczak, supra. Other configurations are shown in co-assigned U.S. patent application Ser. No. 15/335,614, filed Oct. 27, 2016, the disclosure of which is hereby incorporated herein in its entirety. More or fewer gripping tabs may be included in other embodiments.

Figure 8:
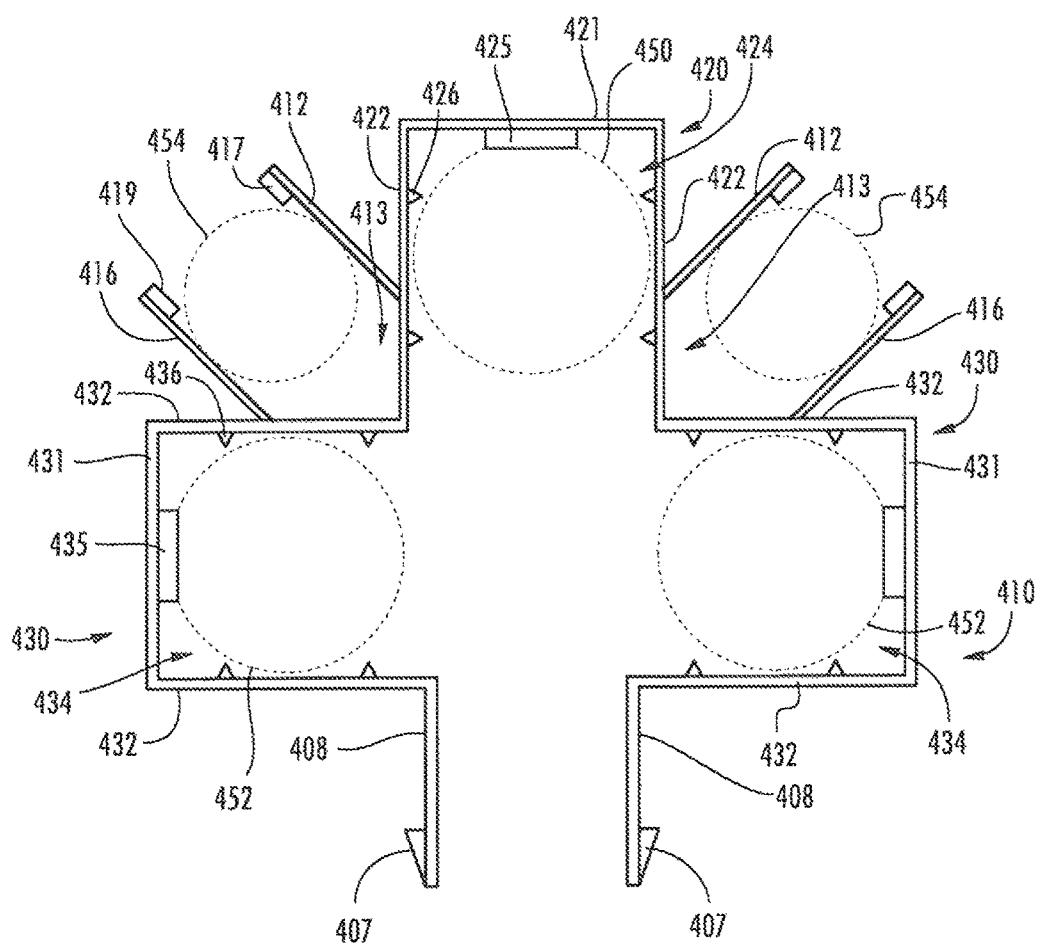
FIG. 8 is a top view of another cable hanger capable of mounting multiple cables according to alternative embodiments of the invention.

Referring now to the drawings, a cable hanger 410 according to embodiments of the invention is shown in FIG. 8. The cable hanger 410 is generally cruciform in shape, with a head portion 420, two arm portions 430, and locking segments 408 on which locking projections 407 or other locking features are located. These are described in greater detail below.

The head portion 420 includes an end wall 421 and two side walls 422 that merge with the end wall 421, thereby defining a head cavity 424. Each of the arm portions 430 includes an end wall 431 and two side walls 432 that merge with the end wall 431, thereby defining respective arm cavities 434. As can be seen in FIG. 5, one of the side walls 432 of each of the arm portions 430 merges with one of the side walls 422 of the head portion 420. The other of the side walls 432 of each of the arm portions 430 merges with a respective locking segment 408.

It can also be seen in FIG. 5 that the head portion 420 includes a lance 425 that extends into the head cavity 424 from the end wall 421, and further includes barbs 426 that extend into the head cavity 424 from the side walls 422. Similarly, each of the arm portions 430 includes a lance 435 that extends into its arm cavity 434 from the end wall 431 and barbs 436 that extend into its arm cavity 434 from the side walls 432. The lances 425, 435 and barbs 426, 436 provide gripping features to the cavities 424, 434; other gripping features, such as teeth, nubs and the like, may also be employed.

FIG. 8 also illustrates that a gripping tab 412 extends from each of the side walls 422 of the head portion 420 at an oblique angle (typically about 45 degrees). A gripping tab 416 also extends at an oblique angle (typically about 45 degrees) from each of the side walls 432 of the arm portions 430 that merge with the side walls 422. Lances 417, 419 are positioned near the ends of respective gripping tabs 412, 416. Each pair of gripping tabs 412, 416 defines a cable mounting location 413 that is located external of the cable hanger 410. (As used herein, a cavity or mounting location is "internal" when it is located within the periphery of the cable hanger 410, and is "external" when it is located outside the periphery of the cable hanger 410).

As can be seen in FIG. 8, the head cavity 424 is sized to receive and grasp a cable 450, which is held in place by the barbs 426 and the lance 425. Each of the arm cavities 434 is also sized to receive and grasp a cable 452, which is held in place by the barbs 436 and the lance 435. Finally, each pair of gripping tabs 412, 416 can grasp a cable 454 as it is located in a respective cable mounting location 413. Thus, in the illustrated configuration, the cable hanger 410 can hold up to five separate cables.

As with the cable hangers 10, 110, 210, 610 discussed above, the cable hanger 410 can be mounted to a mounting structure via the locking projections 407 being deflected toward each other from a relaxed state and being inserted into a hole (typically ¾ inch) in a mounting structure in the deflected condition. The locking segments 408 exert outward pressure on edges of the hole, and the locking projections 407 maintain the cable hanger in a mounted position on the mounting structure.

Those skilled in this art will appreciate that, although the head and arm cavities 424, 434 are shown as being similar, if not identical, in size, in other embodiments the cable hanger 410 may be configured such that the head and arm cavities 424, 434 are of different sizes, or even such that each of the arm cavities 434 is of a different size. In addition, in some embodiments arm portions may be included in a "square wave" pattern so that more cables (e.g., five or seven) may be mounted in a single cable hanger.

Those skilled in this art will also appreciate that the head portion 421 and arm portions 431 may be configured differently. For example, configurations which some or all of the segments of the end and side walls are arcuate or curvilinear rather than straight may be suitable. In addition, the end and side walls may be disposed at oblique angles to one another rather than at generally right angles.

Like the gripping tabs 212, 216, 218 discussed above, the gripping tabs 412, 416 may take a variety of configurations. Some potential configurations for gripping members are shown in U.S. Patent Publication No. 2016/0281881 to Vaccaro and U.S. Pat. No. 8,191,836 to Korczak, supra. Other configurations are shown in co-assigned U.S. patent application Ser. No. 15/335,614, filed Oct. 27, 2016, the disclosure of which is hereby incorporated herein in its entirety. More or fewer gripping tabs may be included in other embodiments.

Figure 9:
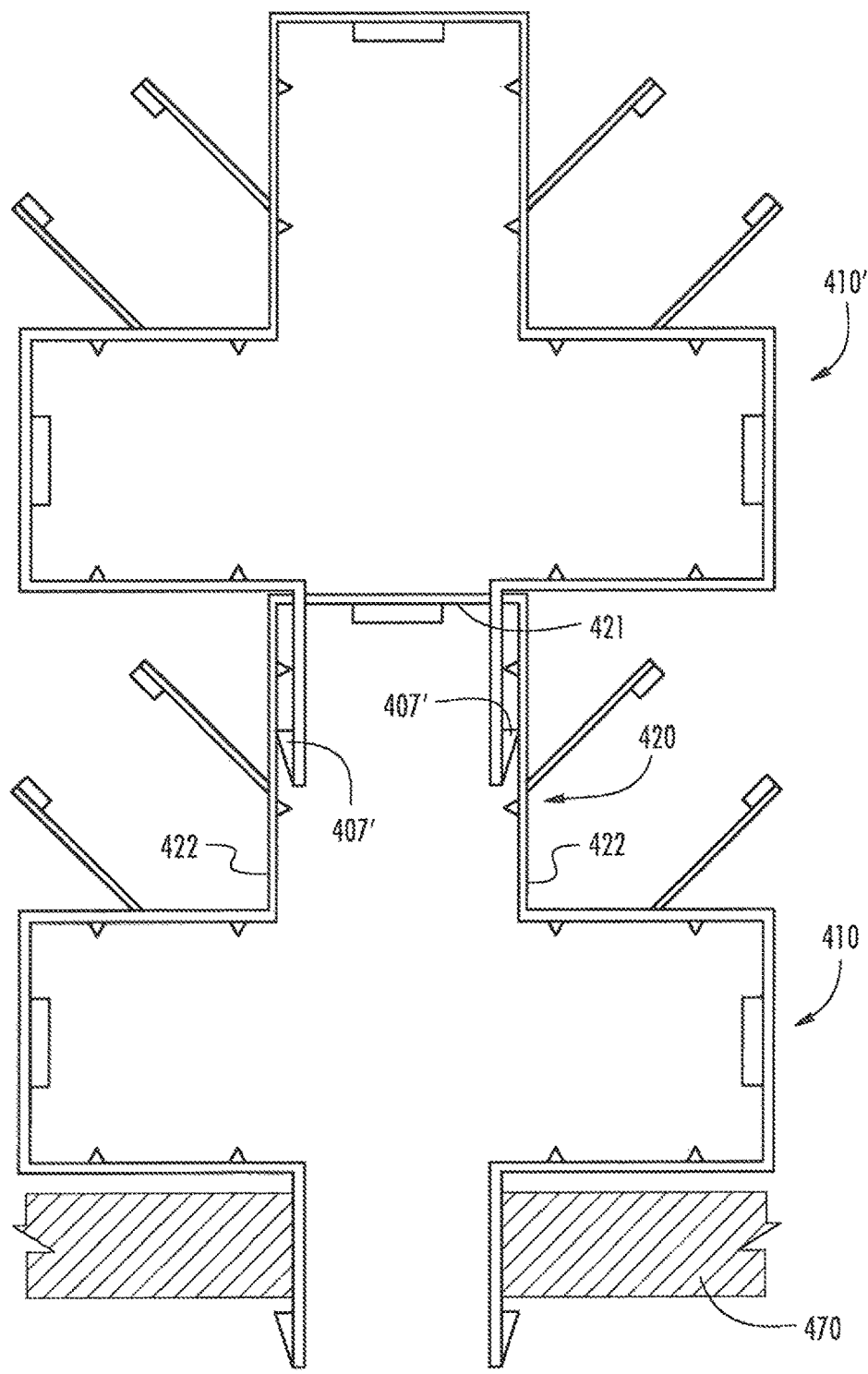
FIG. 9 is a top view of two cable hangers of FIG. 8 deployed in a stacked configuration.

Referring now to FIG. 9, two cable hangers 410, 410' are shown mounted in a stacked relationship. As can be seen from FIG. 6, the locking projections 407' of the cable hanger 410' are inserted into holes (not shown) in the end wall 421 of the head portion 420 of the cable hanger 410 and can be received in slots or holes (not shown) in the side walls 422 of the head section inboard segments 421 of the cable hanger 410. The cable hanger 410 is mounted in a mounting structure 470. In this manner, additional cables (five additional cables in this instance) can be mounted to the same mounting location on the mounting structure 470 with only a single additional cable hanger 410'.

The cable hangers 110, 210, 410 may be formed of a variety of materials, such as steel and other metals. The cable hangers 110, 210 may be stamped from a sheet or strip of material, such as steel, and bent by known methods into the configurations shown herein. As such, the cable hangers 110, 210, 410 may be monolithic component, such as formed strips of steel or other easily-bent materials.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cable hanger for mounting cables to a mounting structure, comprising:
   a head portion defining an internal head cavity for mounting a first cable;
   a pair of arm portions merging with the head portion, each arm portion defining an internal arm cavity for mounting a respective second cable;
   a pair of locking segments, each locking segment merging with a respective one of the arm portions and including a locking projection; and
   a first pair of gripping members, a first one of the gripping members extending from the head portion, and a second one of the gripping members extending from a first one of the arm portions, the gripping members defining a first external cable mounting location for mounting a third cable;
   wherein the cable hanger can be deflected from a relaxed state to a deflected state by forcing the locking segments toward each other; and
   wherein in the deflected state the cable hanger may be mounted to a mounting structure, with the locking projections inserted through a hole in the mounting structure and exerting outward pressure on edges of the hole, and the locking projections maintaining the cable hanger in a mounted position on the mounting structure.

2. The cable hanger defined in claim 1, further comprising gripping features in the head cavity or the arm cavities.

3. The cable hanger defined in claim 1, wherein the first one of the gripping members extends from a side wall of the head portion, and the second one of the gripping members extends from a side wall of a first one of the arm portions.

4. The cable hanger defined in claim 3, wherein the side wall of the one of the arm portion meets the side wall of the head portion to form a generally right angle.

5. The cable hanger defined in claim 3, further comprising a second pair of gripping members, a first one of the gripping members of the second pair extending from the head portion, and a second one of the gripping members of the second pair extending from a second one of the arm portions, the gripping members of the second pair defining a second external cable mounting location for mounting a fourth cable.

6. The cable hanger defined in claim 1, wherein each of the arm portions comprises an end wall and a pair of side walls, such that the internal arm cavities are generally rectangular.

7. The cable hanger defined in claim 1, wherein the head portion comprises an end wall and a pair of side walls, such that the internal head cavity is generally rectangular.

8. The cable hanger defined in claim 1, in combination with the first cable mounted in the head cavity, the second cable mounted in one of the arm cavities, and the third cable mounted in the first external cable mounting location.

* * * * *